US012757190B2

(12) United States Patent
Sabouri-Sichani et al.

(10) Patent No.: US 12,757,190 B2
(45) Date of Patent: Oct. 6, 2026

(54) SCHEDULING GAP AVAILABILITY NOTIFICATION

(71) Applicant: Nokia Technologies Oy, Espoo (FI)

(72) Inventors: Faranaz Sabouri-Sichani, Aalborg (DK); Srinivasan Selvaganapathy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 18/559,549

(22) PCT Filed: May 3, 2022

(86) PCT No.: PCT/EP2022/061805
§ 371 (c)(1),
(2) Date: Nov. 7, 2023

(87) PCT Pub. No.: WO2022/238176
PCT Pub. Date: Nov. 17, 2022

(65) Prior Publication Data

US 2024/0155601 A1 May 9, 2024

(30) Foreign Application Priority Data

May 8, 2021 (IN) ............................ 202141020935

(51) Int. Cl.
*H04W 72/1263* (2023.01)
*H04W 68/02* (2009.01)
*H04W 72/52* (2023.01)

(52) U.S. Cl.
CPC ....... *H04W 72/1263* (2013.01); *H04W 68/02* (2013.01); *H04W 72/52* (2023.01)

(58) Field of Classification Search
CPC . H04W 68/12; H04W 72/1263; H04W 72/52; H04W 76/28; H04W 8/183; H04W 60/005; H04W 68/02
See application file for complete search history.

(56) References Cited

U.S. PATENT DOCUMENTS

2015/0057046 A1 2/2015 Challa et al.
2022/0086759 A1* 3/2022 Höglund ............. H04W 68/005
(Continued)

FOREIGN PATENT DOCUMENTS

EP 3735049 A1 11/2020
EP 3764717 A2 1/2021

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
(Continued)

*Primary Examiner* — Jianye Wu
(74) *Attorney, Agent, or Firm* — Lippes Mathias LLP

(57) ABSTRACT

An apparatus comprising at least one processor; and at least one memory including computer program code; the at least one memory and the computer program code configured to, with the at least one processor, cause the apparatus to perform: enabling scheduling gap usage in relation to a device with multiple subscriptions comprising at least a first subscription configured to enable a first user equipment at the device and a second subscription configured to enable a second user equipment at the device by: determining if there is traffic to schedule for the first user equipment, in radio connected mode, during a part of a configured scheduling gap for the first user equipment corresponding to a paging occasion of the second user equipment, the second user equipment not in radio connected mode; if it is determined that there is traffic to schedule for the first user equipment during a part of the scheduling gap, transmitting configuration information to the first user equipment to configure the first user equipment to provide a response indicating device
(Continued)

availability of the device for the part of the scheduling gap; and monitoring for a response from the first user equipment.

1 Claim, 8 Drawing Sheets

(56) References Cited

U.S. PATENT DOCUMENTS

| | | | | |
|---|---|---|---|---|
| 2022/0264587 | A1* | 8/2022 | Zhang | H04W 72/1215 |
| 2023/0047213 | A1* | 2/2023 | Chen | H04W 8/22 |
| 2023/0108646 | A1* | 4/2023 | Tseng | H04W 68/025 455/458 |

OTHER PUBLICATIONS

"Revised SID: Study on system enablers for multi-SIM devices", TSG SA Meeting #SP-83, SP-190248, Agenda: 17B.19, SA WG2, Mar. 20-22, 2019, 4 pages.
"3rd Generation Partnership Project; Technical Specification Group Services and System Aspects; Study on Support for Multi-USIM Devices (Release 17)", 3GPP TR 22.834, V17.2.0, Dec. 2019, pp. 1-17.
"3rd Generation Partnership Project; Technical Specification Group Services and System Aspects; Study on system enablers for devices having multiple Universal Subscriber Identity Modules (USIM) (Release 17)", 3GPP TR 23.761, V1.4.0, Apr. 2021, pp. 1-108.
"New WID: Support for Multi-SIM devices in Rel-17", 3GPP TSG RAN Meeting #86, RP-193263, Agenda: 9.1.2, vivo, Dec. 9-12, 2019, 5 pages.
"LG A290 Triple SIM", LG, Retrieved on Oct. 17, 2022, Webpage available at : https://www.lg.com/ae/mobile-phones/lg-A290.
"3rd Generation Partnership Project; Technical Specification Group Radio Access Network; NR; User Equipment (UE) procedures in Idle mode and RRC Inactive state (Release 16)", 3GPP TS 38.304, V16.4.0, Mar. 2021, pp. 1-39.
"Switching notification and busy indication", 3GPP TSG-RAN WG2 Meeting #113bise, R2-2103417, Agenda: 8.3.3, Lenovo, Apr. 12-20, 2021, 3 pages.
International Search Report and Written Opinion received for corresponding Patent Cooperation Treaty Application No. PCT/EP2022/061805, dated Aug. 19, 2022, 12 pages.
"[post112-e][256][Multi-SIM] Network switching details (vivo)", 3GPP TSG-RAN WG2 Meeting #113-e, R2-2102262, Agenda: 8.3.3, vivo, Jan. 25-Feb. 5, 2021, 47 pages.

* cited by examiner

SCHEDULING GAP AVAILABILITY NOTIFICATION

RELATED APPLICATION

This application was originally filed as PCT Application No PCT/EP2022/061805, filed on May 3, 2022, which claims priority from application No. 202141020935, filed on May 8, 2021, each of which is incorporated herein by reference in its entirety.

TECHNOLOGICAL FIELD

Embodiments of the present disclosure relate to paging. Some relate to paging in a multiple universal subscriber identity module device.

BACKGROUND

A wireless network comprises a plurality of network nodes including terminal nodes and access nodes. Communication between the terminal nodes and the access nodes is wireless.

In some circumstances, it may be desirable to modify or enhance how paging is configured in the wireless network.

BRIEF SUMMARY

According to various, but not necessarily all, embodiments there is provided an apparatus comprising at least one processor; and at least one memory including computer program code;

the at least one memory and the computer program code configured to, with the at least one processor, cause the apparatus to perform:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

In some examples, the configuration information comprises at least one uplink grant and monitoring for a response from the first user equipment comprises monitoring for a response from the first user equipment on the at least one uplink grant.

In some examples, the at least one memory and the computer program code configured to, with the at least one processor, cause the apparatus to perform:

receiving assistance information, the assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, the at least one memory and the computer program code configured to, with the at least one processor, cause the apparatus to perform:

receiving a response from the first user equipment, the response indicating that the first user equipment is available for scheduling of traffic in the part of the scheduling gap; and in response to receiving the response from the first user equipment, scheduling traffic for the first user equipment during the part of the scheduling gap.

In some examples, the at least one memory and the computer program code configured to, with the at least one processor, cause the apparatus to perform:

transmitting pre-configuration information to the first user equipment, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the assistance information comprises paging probability information and the at least one memory and the computer program code configured to, with the at least one processor, cause the apparatus to perform:

determining whether to transmit the configuration information based, at least in part, on the paging probability information or determining whether to schedule traffic for the first user equipment during the part of the scheduling gap based, at least in part on the paging probability information.

In some examples, the configuration information comprises information to configure the first user equipment to resume radio connected operation during the part of the scheduling gap unless the second user equipment receives an early indication of paging.

In some examples, the at least one memory and the computer program code configured to, with the at least one processor, cause the apparatus to perform:

receiving a response from the first user equipment, the response indicating that the first user equipment is not available for scheduling of traffic in the part of the scheduling gap; and in response to receiving the response from the first user equipment, preventing scheduling of traffic for the first user equipment during the part of the scheduling gap.

In some examples, the at least one memory and the computer program code configured to, with the at least one processor, cause the apparatus to perform:

detecting no response from the first user equipment; and in response to not detecting a response from the first user equipment, scheduling traffic for the first user equipment during the part of the scheduling gap.

According to various, but not necessarily all, embodiments there is provided a method comprising:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

In some examples, the configuration information comprises at least one uplink grant and monitoring for a response from the first user equipment comprises monitoring for a response from the first user equipment on the at least one uplink grant.

In some examples the method comprising:

receiving assistance information, the assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, the method comprising:

receiving a response from the first user equipment, the response indicating that the first user equipment is available for scheduling of traffic in the part of the scheduling gap; and in response to receiving the response from the first user equipment, scheduling traffic for the first user equipment during the part of the scheduling gap.

In some examples, the method comprising:

transmitting pre-configuration information to the first user equipment, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the assistance information comprises paging probability information and the method comprising:

determining whether to transmit the configuration information based, at least in part, on the paging probability information or determining whether to schedule traffic for the first user equipment during the part of the scheduling gap based, at least in part on the paging probability information.

In some examples, the configuration information comprises information to configure the first user equipment to resume radio connected operation during the part of the scheduling gap unless the second user equipment receives an early indication of paging.

In some examples, the method comprising:

receiving a response from the first user equipment, the response indicating that the first user equipment is not available for scheduling of traffic in the part of the scheduling gap; and in response to receiving the response from the first user equipment, preventing scheduling of traffic for the first user equipment during the part of the scheduling gap.

In some examples, the method comprising:

detecting no response from the first user equipment; and in response to not detecting a response from the first user equipment, scheduling traffic for the first user equipment during the part of the scheduling gap.

According to various, but not necessarily all, embodiments there is provided a computer program comprising instructions for causing an apparatus to perform at least the following:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

In some examples, the configuration information comprises at least one uplink grant and monitoring for a response from the first user equipment comprises monitoring for a response from the first user equipment on the at least one uplink grant.

In some examples, the computer program comprising instructions for causing an apparatus to perform:

receiving assistance information, the assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, the computer program comprising instructions for causing an apparatus to perform:

receiving a response from the first user equipment, the response indicating that the first user equipment is available for scheduling of traffic in the part of the scheduling gap; and in response to receiving the response from the first user equipment, scheduling traffic for the first user equipment during the part of the scheduling gap.

In some examples, the computer program comprising instructions for causing an apparatus to perform:

transmitting pre-configuration information to the first user equipment, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the assistance information comprises paging probability information and the computer program comprising instructions for causing an apparatus to perform:

determining whether to transmit the configuration information based, at least in part, on the paging probability information or determining whether to schedule traffic for the first user equipment during the part of the scheduling gap based, at least in part on the paging probability information.

In some examples, the configuration information comprises information to configure the first user equipment to resume radio connected operation during the part of the scheduling gap unless the second user equipment receives an early indication of paging.

In some examples, the computer program comprising instructions for causing an apparatus to perform:

receiving a response from the first user equipment, the response indicating that the first user equipment is not available for scheduling of traffic in the part of the scheduling gap; and in response to receiving the response from the first user equipment, preventing scheduling of traffic for the first user equipment during the part of the scheduling gap.

In some examples, the computer program comprising instructions for causing an apparatus to perform:

detecting no response from the first user equipment; and in response to not detecting a response from the first user equipment, scheduling traffic for the first user equipment during the part of the scheduling gap.

According to various, but not necessarily all, embodiments there is provided an apparatus comprising means for:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

In some examples, the configuration information comprises at least one uplink grant and monitoring for a response from the first user equipment comprises monitoring for a response from the first user equipment on the at least one uplink grant.

In some examples, the means are configured to:

receive assistance information, the assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, the means are configured to:

receive a response from the first user equipment, the response indicating that the first user equipment is available for scheduling of traffic in the part of the scheduling gap; and in response to receiving the response from the first user equipment, schedule traffic for the first user equipment during the part of the scheduling gap.

In some examples, the means are configured to:

transmit pre-configuration information to the first user equipment, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the assistance information comprises paging probability information and wherein the means are configured to:

determine whether to transmit the configuration information based, at least in part, on the paging probability information or determine whether to schedule traffic for the first user equipment during the part of the scheduling gap based, at least in part on the paging probability information.

In some examples, the configuration information comprises information to configure the first user equipment to resume radio connected operation during the part of the scheduling gap unless the second user equipment receives an early indication of paging.

In some examples, the means are configured to:

receive a response from the first user equipment, the response indicating that the first user equipment is not available for scheduling of traffic in the part of the scheduling gap; and in response to receiving the response from the first user equipment, prevent scheduling of traffic for the first user equipment during the part of the scheduling gap.

In some examples, the means are configured to:

detect no response from the first user equipment; and in response to not detecting a response from the first user equipment, schedule traffic for the first user equipment during the part of the scheduling gap.

According to various, but not necessarily all, embodiments there is provided an apparatus comprising at least one processor; and at least one memory including computer program code;

the at least one memory and the computer program code configured to, with the at least one processor, cause the apparatus to perform:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

In some examples the configuration information comprises at least one uplink grant;

determining whether to transmit a response comprises determining whether to transmit a response on the at least one uplink grant; and transmitting a response comprises transmitting a response on at least one of the at least one uplink grant.

In some examples, the at least one memory and the computer program code configured to, with the at least one processor, cause the apparatus to perform:

transmitting assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, transmitting a response comprises transmitting a response indicating that the first user equipment is available for scheduling of traffic in the part of the scheduling gap; and the at least one memory and the computer program code configured to, with the at least one processor, cause the apparatus to perform:

receiving traffic for the first user equipment during the part of the scheduling gap.

In some examples, the at least one memory and the computer program code configured to, with the at least one processor, cause the apparatus to perform:

receiving pre-configuration information, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the at least one memory and the computer program code configured to, with the at least one processor, cause the apparatus to perform:

determining paging probability information; and transmitting the determined paging probability information in the assistance information.

In some examples, the configuration information comprises information to configure the first user equipment to resume radio connected operation during the part of the scheduling gap unless the second user equipment receives an early indication of paging.

In some examples, transmitting a response comprises transmitting a response indicating that the first user equipment is not available for scheduling of traffic in the part of the scheduling gap.

In some examples, the at least one memory and the computer program code configured to, with the at least one processor, cause the apparatus to perform:

determining that the first user equipment is available for scheduling of traffic during the part of the scheduling gap; and in response to determining that the first user equipment is available for scheduling of traffic during the part of the scheduling gap, resuming radio connected operation during the part of the gap without transmitting a response on at least one of the at least one uplink grant.

According to various, but not necessarily all, embodiments there is provided a method comprising:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

In some examples, the configuration information comprises at least one uplink grant;

determining whether to transmit a response comprises determining whether to transmit a response on the at least one uplink grant; and transmitting a response comprises transmitting a response on at least one of the at least one uplink grant.

In some examples, the method comprising:

transmitting assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, transmitting a response comprises transmitting a response indicating that the first user equipment is available for scheduling of traffic in the part of the scheduling gap; and the method comprising:

receiving traffic for the first user equipment during the part of the scheduling gap.

In some examples, the method comprising:

receiving pre-configuration information, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the method comprising:

determining paging probability information; and transmitting the determined paging probability information in the assistance information.

In some examples, the configuration information comprises information to configure the first user equipment to resume radio connected operation during the part of the scheduling gap unless the second user equipment receives an early indication of paging.

In some examples transmitting a response comprises transmitting a response indicating that the first user equipment is not available for scheduling of traffic in the part of the scheduling gap.

In some examples, the method comprising:

determining that the first user equipment is available for scheduling of traffic during the part of the scheduling gap; and in response to determining that the first user equipment is available for scheduling of traffic during the part of the scheduling gap, resuming radio connected operation during the part of the gap without transmitting a response on at least one of the at least one uplink grant.

According to various, but not necessarily all, embodiments there is provided a computer program comprising instructions for causing an apparatus to perform:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

In some examples, the configuration information comprises at least one uplink grant;

determining whether to transmit a response comprises determining whether to transmit a response on the at least one uplink grant; and transmitting a response comprises transmitting a response on at least one of the at least one uplink grant.

In some examples, the computer program comprising instructions for causing an apparatus to perform:

transmitting assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, transmitting a response comprises transmitting a response indicating that the first user equipment is available for scheduling of traffic in the part of the scheduling gap; and the computer program comprising instructions for causing an apparatus to perform:

receiving traffic for the first user equipment during the part of the scheduling gap.

In some examples, the computer program comprising instructions for causing an apparatus to perform:

receiving pre-configuration information, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the computer program comprising instructions for causing an apparatus to perform:

determining paging probability information; and transmitting the determined paging probability information in the assistance information.

In some examples, the configuration information comprises information to configure the first user equipment to resume radio connected operation during the part of the scheduling gap unless the second user equipment receives an early indication of paging.

In some examples, transmitting a response comprises transmitting a response indicating that the first user equipment is not available for scheduling of traffic in the part of the scheduling gap.

In some examples, the computer program comprising instructions for causing an apparatus to perform:

determining that the first user equipment is available for scheduling of traffic during the part of the scheduling gap; and in response to determining that the first user equipment is available for scheduling of traffic during the part of the scheduling gap, resuming radio connected operation during the part of the gap without transmitting a response on at least one of the at least one uplink grant.

According to various, but not necessarily all, embodiments there is provided an apparatus comprising means for:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

In some examples, the configuration information comprises at least one uplink grant;

determining whether to transmit a response comprises determining whether to transmit a response on the at least one uplink grant; and transmitting a response comprises transmitting a response on at least one of the at least one uplink grant.

In some examples, the means are configured to:

transmit assistance information comprising information at least indicative of an early paging indication configuration of the second user equipment at a network.

In some examples, the part of the scheduling gap comprises at least a portion of the scheduling gap after a part of the scheduling gap corresponding to possible reception of an early paging indication by the second user equipment.

In some examples, the configuration information comprises information to inform the first user equipment that there is traffic to be scheduled for the first user equipment during the part of the scheduling gap.

In some examples, transmitting a response comprises transmitting a response indicating that the first user equipment is available for scheduling of traffic in the part of the scheduling gap; and wherein the means are configured to:

receive traffic for the first user equipment during the part of the scheduling gap.

In some examples, the means are configured to:

receive pre-configuration information, the pre-configuration information comprising information to inform the first user equipment that early end of the scheduling gap is possible and/or to configure the first user equipment to monitor for the configuration information.

In some examples, the configuration information comprises a physical downlink control channel with a single uplink grant.

In some examples, the configuration information comprises information at least indicative of a traffic type and/or a service type associated with the traffic.

In some examples, the means are configured to:

determine paging probability information; and transmit the determined paging probability information in the assistance information.

In some examples, the configuration information comprises information to configure the first user equipment to resume radio connected operation during the part of the scheduling gap unless the second user equipment receives an early indication of paging.

In some examples, transmitting a response comprises transmitting a response indicating that the first user equipment is not available for scheduling of traffic in the part of the scheduling gap.

In some examples, the means are configured to:

determining that the first user equipment is available for scheduling of traffic during the part of the scheduling gap; and in response to determining that the first user equipment is available for scheduling of traffic during the part of the scheduling gap, resuming radio connected operation during the part of the gap without transmitting a response on at least one of the at least one uplink grant.

According to various, but not necessarily all, embodiments there is provided an apparatus comprising at least one processor; and at least one memory including computer program code;

the at least one memory and the computer program code configured to, with the at least one processor, cause the apparatus at least to perform at least a part of one or more methods disclosed herein.

According to various, but not necessarily all, embodiments there is provided an apparatus comprising means for performing at least part of one or more methods disclosed herein.

According to various, but not necessarily all, embodiments there is provided examples as claimed in the appended claims.

The description of a function and/or action should additionally be considered to also disclose any means suitable for performing that function and/or action.

BRIEF DESCRIPTION

Some examples will now be described with reference to the accompanying drawings in which.

ABBREVIATIONS

3GPP—3$^{rd}$ Generation Partnership Project
UE—User Equipment
SIM—Subscriber Identification Module
USIM—Universal Subscriber Identification Module
MUSIM—Multiple Universal Subscriber Identification Module
IMSI—International Mobile Subscriber Identity
EPS—Evolved Packet System
TMSI—Temporary Mobile Subscriber Identity
GUTI—Global Unique Temporary Identifier
RRC—Radio Resource Control
PDCCH—Physical Downlink Control Channel
PDSCH—Physical Downlink Shared Channel PEI—Paging Early Indicator
PO—Paging Occasion
SSB—Synchronization Signal and PBCH block
SUPI—Subscription Permanent Identifier
DRX—Discontinuous Reception
RAN—Radio Access Network
MME—Mobile Management Entity
AMF—Access and Mobility Management Function
NW—Network Definitions RRC_CONNECTED—A state where UE has dedicated radio connection for active data transmission.

RRC_INACTIVE—A state where UE monitors for paging and needs to establish radio connection with gNodeB (gNB) to start data transmission. In this state the radio-resource related configuration is stored at UE for quick resuming of RRC connection. Likewise, the UE context is not released at the network. This state is maintained between UE and gNB (base station).

RRC_IDLE—A state where UE monitors for paging and needs to establish radio connection to start data transmission. As there is no radio-resource configuration stored the RRC connection setup procedure is used to configure radio resources.

DETAILED DESCRIPTION

Figure 1:
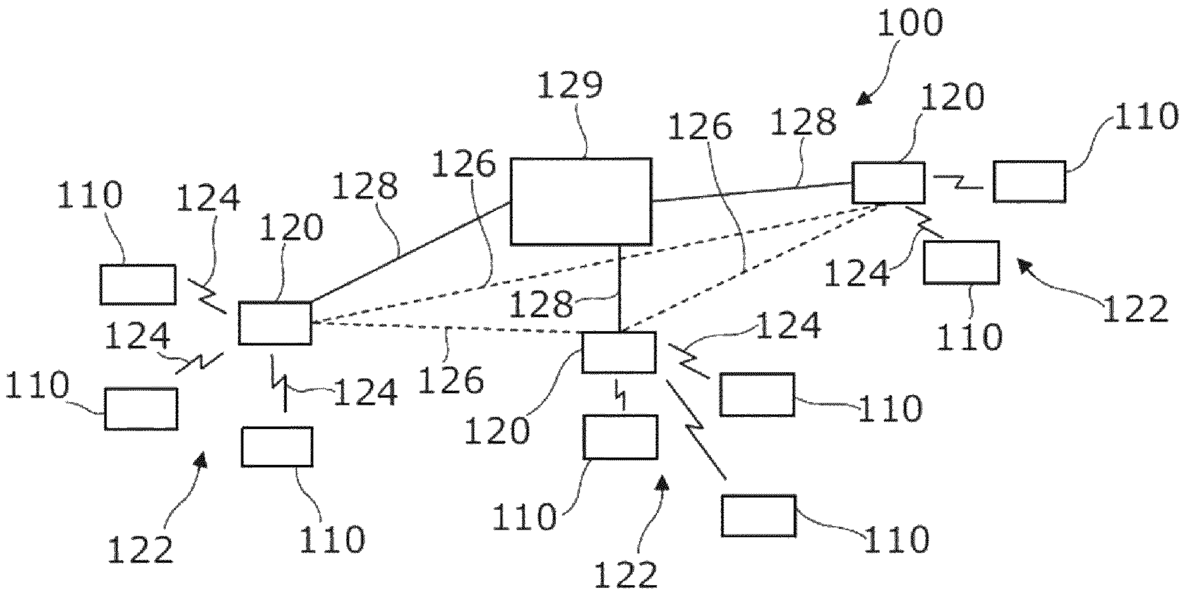
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The one or more terminal nodes 110 may, in some examples, communicate with each other.

The network 100 may be a cellular network comprising a plurality of cells 122 at least one served by an access node 120. In this example, the interface between the terminal nodes 110 and an access node 120 defining a cell 122 is a wireless interface 124.

The access node(s) 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations (for example, gNBs).

Functionality of a base station may be distributed between a central unit (CU), for example a gNB-CU, and one or more distributed units (DU), for example gNB-DUs.

In the particular example illustrated the network 100 is an Evolved Universal Terrestrial Radio Access network (E-UTRAN). The E-UTRAN consists of E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs), providing the user plane and control plane (for example, RRC) protocol terminations towards the UE. The gNBs are interconnected with each other by means of an X2/Xn interface 126. The gNBs are also connected by means of the N2 interface 128 to the Access and Mobility management Function (AMF).

In examples, the network 100 can comprise a combination of E-UTRAN and NG-RAN.

In examples, a terminal node 110 can monitor for paging signals. Paging configuration at a terminal node 110 can be configured by the network, for example by an access node 120 or core node 129.

Some examples relate to a 3GPP network.

Figure 2:
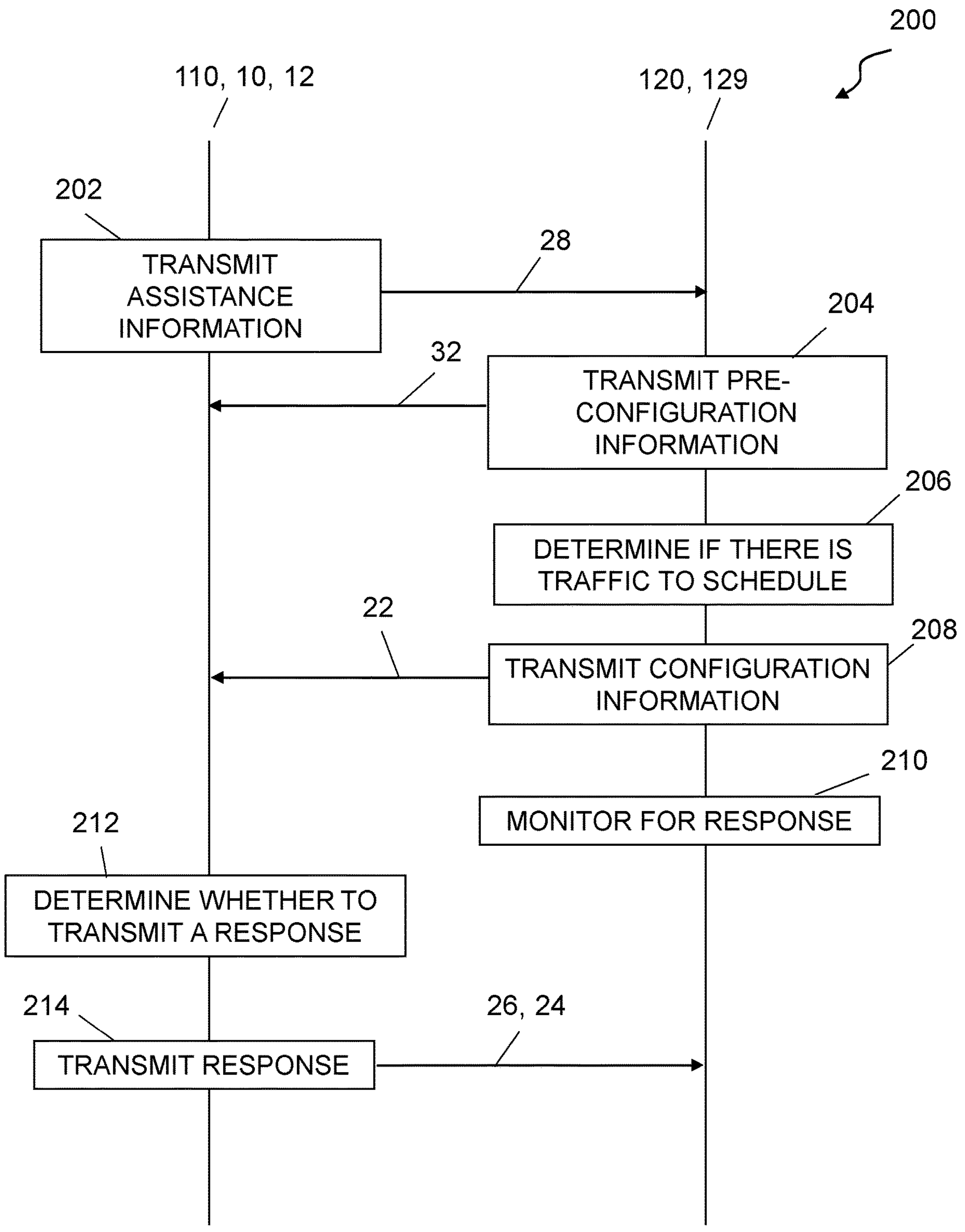
FIG. 2 shows another example of the subject matter described herein.

FIG. 2 illustrates an example of a method 200.

In examples, FIG. 2 can be considered to illustrate a plurality of methods. For example, FIG. 2 illustrates one or more actions at a plurality of actors/entities. In examples, FIG. 2 can be considered to illustrate a plurality of methods performed by the individual actors/entities.

One or more of the features discussed in relation to FIG. 2 can be found in one or more of the other FIGS. During discussion of FIG. 2, reference will be made to other FIGS. for the purposes of explanation.

In the example of FIG. 2, a plurality of apparatuses transmit and/or receive one or more signals and/or one or more messages across and/or via and/or using a network. In examples, any suitable form of communication in any suitable network can be used. For example, at least a portion of the network 100 of FIG. 1 can be used.

Accordingly, in examples, the plurality of apparatuses in FIG. 2 form at least a portion of a network 100 as described in relation to FIG. 1.

In the illustrated example, a terminal node 110 and a network node transmit and/or receive one or more signals and/or one or more messages.

In examples, communications and/or transmissions between elements illustrated in FIG. 2 can proceed via any number of intervening elements, including no intervening elements.

In examples, method 200 and/or parts of method 200 can be considered a method of controlling scheduling gaps for paging monitoring at a terminal node 110 and/or a method of reducing scheduling gaps for paging monitoring at a terminal node 110 at a terminal node 110.

In some examples, method 200 and/or parts of method 200 can be considered a method of efficiently using scheduling gaps for paging monitoring and/or a method of minimizing scheduling gaps for paging monitoring.

In some examples, the network node is/comprises an access node 120, such as a gNodeB (gNB). In some examples, the network node is/comprises a core node 129.

In some examples, the terminal node 110 is a device with multiple subscriptions comprising at least a first subscription configured to enable a first user equipment (UE1) at the device and a second subscription configured to enable a second user equipment (UE2) at the device. However, in examples, the terminal node 110 can have any suitable number of subscriptions configured to enable any suitable number of UEs at the terminal node 110.

Any suitable subscription can be used. In examples, a subscription can be a 3GPP subscription, a 3GPP2 subscription, an Enhanced Support of Non-Public Networks (eNPN) subscription and so on.

In some examples, the terminal node 110 is a multiple SIM device and/or a multiple USIM (MUSIM) device comprising a plurality of SIMs/USIMs configured to enable a plurality of UEs at the terminal node 110.

Accordingly, in examples, the terminal node 110 is a MUSIM device comprising at least a first USIM configured to enable a first UE (UE1) at the device and a second USIM configured to enable a second UE (UE2) at the device. However, in examples, the terminal node 110 can have any suitable number of USIMs configured to enable any suitable number of UEs at the terminal node 110.

In examples, the terminal node 110 can be considered a device configured for multiple USIM operation.

In examples, a subscription and/or USIM can be considered to enable and/or configure and/or provide a UE at the terminal node 110.

In examples, enabling and/or configuring and/or providing a UE at the terminal node 110 can be considered enabling and/or configuring and/or providing UE functionality at the terminal node 110.

In examples, enabling and/or configuring and/or providing a UE at the terminal node 110 can be considered enabling and/or configuring and/or providing the terminal node 110 to function as a UE.

For example, a terminal node 110 configured with multiple subscriptions and/or multiple USIMs is enabled to receive paging for each of the registered subscriptions and/or USIMs.

Accordingly, in examples, enabling a first UE at the terminal node 110 can be considered enabling the terminal node 110 to function as a first UE.

Accordingly, in examples, enabling a second UE at the terminal node 110 can be considered enabling the terminal node 110 to function as a second UE.

Accordingly, in examples, enabling a first and second UE at the terminal node 110 can be considered enabling the terminal node 110 to function as a first UE and also as a second UE.

In examples, the subscriptions at the terminal node 110 and/or USIMS at the terminal node 110 and/or UEs enabled at the terminal node 110 have at least one associated identifier. For example, a first subscription and/or first USIM and/or first UE (UE1) enabled at the terminal node 110 has an associated identifier, a second subscription and/or USIM and/or UE (UE2) enabled at the terminal node 110 has a different associated identifier and so on.

Any suitable identifier(s) can be used. For example, International Mobile Subscriber Identities (IMSI) in case of evolved packet system (EPS) or Subscription Permanent Identifier (SUPI) in case of 5G system.

In examples, the subscriptions at the terminal node 110 and/or USIMS at the terminal node 110 and/or UEs enabled at the terminal node 110 can be assigned a temporary identifier such as Temporary Mobile Subscriber Identity (TMSI) or a Global Unique Temporary Identifier (GUTI) and so on.

Accordingly, in examples, from the point of view of the network, the terminal node 110 represents a plurality of UEs having different associated identifiers.

In examples, a paging configuration for a UE can be based, at least in part, on one or more identifiers associated with a subscription and/or USIM and/or UE enabled at the terminal node.

In examples, the plurality of subscriptions and/or USIMS and/or UEs enabled at the terminal node 110 are associated with one or more networks.

In some examples, one or more subscriptions and/or USIMS and/or UEs enabled at the terminal node 110 can be associated with one or more different networks.

In examples, a first subscription and/or USIM and/or UE (UE1) enabled at the terminal node 110 is associated with a first network and a second subscription and/or USIM and/or UE (UE2) enabled at the terminal node 110 is associated with a second, different network.

Accordingly, in examples, the terminal node 110 can be considered a MUSIM device comprising at least a first USIM configured to enable a first UE (UE1) associated with a first network and a second USIM configured to enable a second UE (UE2) associated with a second, different network.

In examples, different network nodes can be associated with different networks. See, for example, FIGS. 6 to 8.

In examples, the receiving capability and/or receiving configuration of the terminal node 110 is restricted and/or limited compared to the number of subscriptions and/or USIMs and/or UEs enabled at the terminal node 110.

In some examples, the receiving capability and/or configuration of the terminal node 110 can be considered to be restricted and/or limited compared to the number of different networks associated with the subscriptions and/or USIMs and/or UEs enabled at the terminal node 110.

For example, the terminal node 110 can have enabled UEs associated with a first network and second, different network but be configured to receive from one network at a time.

Similarly, the terminal node 110 can have enabled UEs associated with three different networks but be configured to receive from one or two different networks at a time and so on.

The terminal node 110 having restricted and/or limited receiving capability compared to the number of associated networks can cause problems in relation to paging.

For example, a radio connection at a first UE enabled at the terminal node 110 with a first network can be interrupted by paging for a second UE enabled at the terminal node and in radio inactive mode with a second, different network, if the terminal node cannot receive from both networks simultaneously.

In examples, a scheduling gap 16 is configured for the first UE to allow for paging of the second UE. For example, a scheduling gap 16 can be configured for the first UE corresponding with a paging occasion 20 of the second UE.

In examples, a scheduling gap can be considered a period of time in which there is no uplink or downlink scheduling for a UE.

In examples, a scheduling gap 16 can be considered a scheduling break, a scheduling pause and/or a scheduling hiatus and so on.

Figure 3:
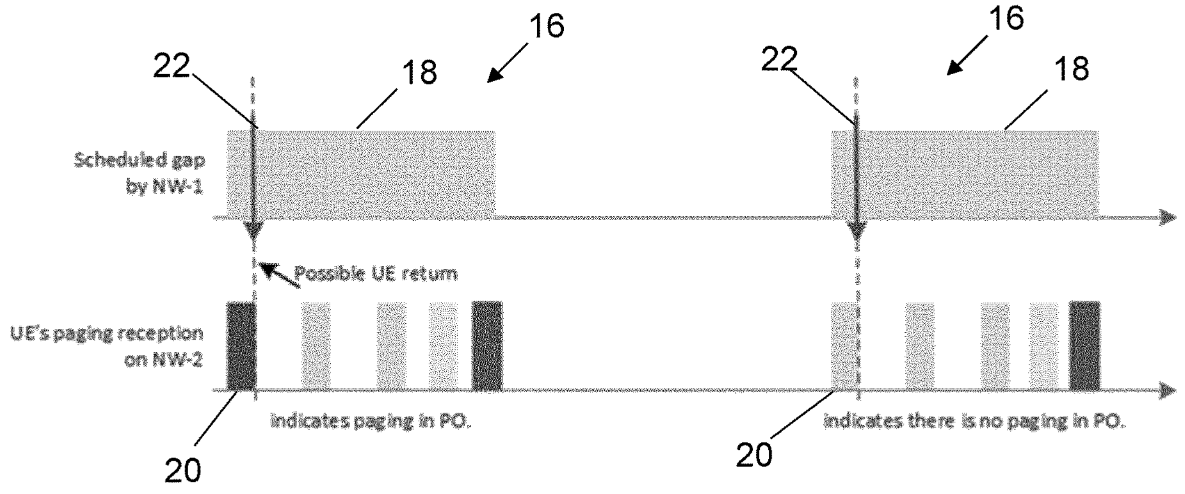
FIG. 3 shows another example of the subject matter described herein.

By way of example, reference is made to FIG. 3.

In the upper portion of FIG. 3, a scheduling gap 16 for a first UE is illustrated by a shaded rectangle corresponding to a paging occasion 20 as illustrated in the lower portion of FIG. 3.

Accordingly, as can be seen from the example of FIG. 3, scheduling of traffic for the first UE is interrupted for the duration of the scheduling gap 16, to allow for reception at the second UE for the paging occasion 20 of the second UE.

Referring back to FIG. 2, in examples, method 200 and/or parts of method 200 can be considered a method 200 of enabling and/or supporting scheduling gap usage in relation to a device with multiple subscriptions comprising at least a first subscription configured to enable a first user equipment (UE) 10 at the device and a second subscription configured to enable a second user equipment (UE) 12 at the device.

In examples, the first UE 10 is in radio connected mode and the second UE 12 is not in radio connected mode. For example, the second UE 12 can be in radio idle mode or radio inactive mode.

In examples, the network node in FIG. 2 is a network node to which the first UE 10 is connected in radio connected mode.

A radio connected mode, a radio idle mode and/or a radio inactive mode can comprise/be any suitable mode of a UE at the terminal node 110.

For example, a radio connected mode can be a mode where a UE has a dedicated radio connection for active data transmission.

For example, a radio inactive mode can be a mode where a UE monitors for paging and has to establish a radio connection to start data transmission. In a radio inactive mode, a radio-resource related configuration is stored at a UE for resuming of a radio connection, such as an RRC connection.

For example, a radio idle mode can be a mode where a UE monitors for paging and has to establish a radio connection to start data transmission. In this mode, a radio connection procedure, such as an RRC connection procedure, is used to configure radio resources.

A radio connected mode can be an RRC_CONNECTED mode. A radio inactive mode can be an RRC_INACTIVE mode. A radio idle mode can be an RRC_IDLE mode.

In examples, a radio mode can be considered a radio state.

At block 202, method 200 comprises transmitting assistance information 28 comprising information at least indicative of an early paging indication configuration of the second UE 12 at a network.

In the illustrated example, the location of the blocks indicates the entity performing the action(s). For example, in FIG. 2, block 202 is performed at and/or by the terminal node 110.

In the example of FIG. 2, block 202 can be considered to be performed by the terminal node 110 and/or the first UE 10 at the terminal node 110.

As FIG. 2 illustrates one or more actions of transmission, FIG. 2 also illustrates the corresponding receiving feature (s)/action(s) and vice versa.

For example, from the point of view of the network node, block 202 can be considered to illustrate receiving assistance information 28 comprising information at least indicative of an early paging indication configuration of the second UE 12 at a network.

This is illustrated in the example of FIG. 2, by the arrow pointing from block 202 to the line representing the network node.

In examples, the assistance information 28 can comprise any suitable information. For example, the assistance information 28 can comprise any suitable information to inform the network node of an early paging indication configuration of the second UE 12 as configured by the second network associated with the second UE 12 (not illustrated in the example of FIG. 2) In examples, the assistance information 28 comprises information to allow the network node, and therefore the network associated with the first UE 10, to know the configuration of the second UE 12 to receive early paging indication.

In examples, an early paging indication configuration can be considered a configuration to receive an early paging indication.

An early paging indication can be and/or comprise any suitable information to inform the second UE 12 if there is paging present during a paging occasion 20 of the second UE 12.

In examples, the early paging indication is and/or comprises a paging early indicator (PEI). In such examples, the early paging indication configuration of the second UE 12 can be considered a PEI configuration of the second UE 12.

In examples, the terminal node 110 can determine the assistance information 28. In some examples, the first UE 10 can be considered to determine the assistance information 28.

Accordingly, in some examples, method 200 can be considered to comprise determining assistance information 28.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In examples, information at least indicative of an early paging indication configuration of the second UE 12 can be received by the first UE 10 from the second UE 12.

Accordingly, in some examples, an early paging indication configuration is received by the second UE 12, from the network associated with the second UE 12, and information at least indicative of the early paging indication configuration internally provided to the first UE 10 in the terminal node 110.

In some examples, the assistance information 28 comprises information for/to be used by the network node in determining if configuration information 22 should be transmitted to the terminal node 110. See, for example, block 208.

In examples, the assistance information 28 comprises paging probability information of the second UE 12.

In examples paging probability information can be considered any suitable information at least indicative of and/or configured to allow and/or enable a determination of paging probability of the second UE 12.

For example, paging probability information can comprise information at least indicative of the probability that the second UE 12 will be paged at a given paging occasion 20 of the second UE 12.

In some examples, paging probability information can comprise information at least indicative of how frequently the second UE 12 has been paged over a number of previous paging occasions 20.

In examples, paging probability information can be determined at and/or by the terminal node 110 in any suitable way using any suitable method.

In some examples, the second UE 12 can monitor the number of times that the second UE 12 is paged across a number of paging occasions 20 and determine the paging probability information based, at least in part, on the monitoring.

In some examples, the second UE 12 can internally provide data from the monitoring to the first UE 10 to allow the first UE 10 to determine the paging probability information.

In some examples, the data from the monitoring can be considered paging probability information and can be transmitted to the network node.

Accordingly, in examples, method 200 comprises determining paging probability information and transmitting the determined paging probability information in and/or with the assistance information 28.

In some examples, method 200 does not comprise block 202. Accordingly, in some examples, block 202 can be omitted.

In the example of FIG. 2 a scheduling gap 16 is configured for the first UE 10 corresponding to a paging occasion 20 of the second UE 12.

In some examples, a plurality of scheduling gaps 16 are configured for the first UE 10 corresponding to a plurality of paging occasions 20 of the second UE 12. In examples, the plurality of scheduling gaps 16 can be periodic.

At block 204, method 200 comprises transmitting pre-configuration information 32 to the first UE 10, the pre-configuration information 32 comprising information to inform the first UE 10 that early end of the scheduling gap 16 is possible and/or to configure the first UE 10 to monitor for configuration information 22. See, for example, block 208.

In examples, the pre-configuration information 32 can be transmitted with information to configure one or more scheduling gaps 16 for the first UE 10. For example, the pre-configuration information 32 can be transmitted with a radio connection configuration message, for example an RRCConnectionReconfiguration message to the first UE 10. See, for example, FIGS. 6 and 7.

In examples, the pre-configuration information 32 can comprise any suitable information to inform the first UE 10 that early end of the scheduling gap 16 is possible and/or to configure the first UE 10 to monitor for configuration information 22.

In examples, information to inform the first UE 10 that early end of the scheduling gap 16 is possible can be considered information to inform the first UE 10 that it is possible that scheduling of traffic for the first UE 10 will start prior to the end of the scheduling gap 16.

In some examples, the pre-configuration information 32 comprises information to inform the first UE 10 that it is possible that the scheduling gap 16 will end after a part of the scheduling gap 16 corresponding to possible reception of an early paging indicator by the second UE 12.

In some examples, the pre-configuration information 32 comprises information to configure the first UE 10 to monitor for configuration information 22 after a part of the scheduling gap 16 corresponding to possible reception of an early paging indicator by the second UE.

See, for example, FIG. 3.

In examples, the pre-configuration information 32 can be considered configuration information.

In examples, the pre-configuration information 32 is transmitted based, at least in part, on the type of traffic and/or service type at the first UE 10. For example, the pre-configuration information 32 can be transmitted when it is possible, but not certain, that there is traffic to schedule for the first UE 10 during the scheduling gap 16.

Accordingly, in examples, the pre-configuration information 32 can be considered information to prepare and/or configure the first UE 10 for an early end of the scheduling gap 16.

In some examples, there can be ongoing traffic with the first UE 10 and the pre-configuration information 32 is not transmitted. That is, in some examples, block 204 can be omitted.

In some examples, the configuration information 22 can be used to inform the first UE 10 that there is traffic to be scheduled during the scheduling gap 16. Accordingly, in such examples, the pre-configuration information 32 can be transmitted to configure the first UE 10 to monitor for the configuration information 22. See, for example, FIGS. 6 and 7.

However, in examples where there is ongoing traffic with the first UE 10, the network node does not have to inform the first UE 10 that there is traffic to be scheduled during the scheduling gap 16 and therefore, in some examples, the pre-configuration information 32 can be omitted as the first UE 10 is already aware that there is traffic to be scheduled during the scheduling gap and does not have to monitor for an indication that there is traffic to be scheduled in the scheduling gap 16. See, for example, FIG. 8.

At block 206, method 200 comprises determining if there is traffic to schedule for the first UE 10, in radio connected mode, during a part 18 of a configured scheduling gap 16 for the first user equipment 10 corresponding to a paging occasion 20 of the second UE 12, the second UE 12 not in radio connected mode.

In examples, determining if there is traffic to schedule for the first UE 10 at block 206 can be performed in any suitable way using any suitable method.

In some examples, determining if there is traffic to schedule for the first UE 10 at block 206 comprises determining if there is ongoing traffic with the first UE 10.

In some examples, determining if there is traffic to schedule for the first UE 10 at block 206 comprises determining if there is ongoing traffic with the first UE 10 that is sensitive to interruption.

For example, there can already be ongoing traffic with the first UE 10 when a request for a scheduling gap 16 is received by the network node.

Accordingly, in examples, block 206 can be performed prior to the scheduling gap 16 starting.

In some examples, determining if there is traffic to schedule for the first UE 10 at block 206 comprises determining if data has been received for transmission to the first UE 10 during the part 18 of the scheduling gap 16.

Accordingly, in examples, determining if there is traffic to schedule for the first UE 10 at block 206 can be performed after the scheduling gap 16 has started. For example, block 206 can, in some examples, be performed during and/or after a part of the scheduling gap 16 corresponding to possible reception of an early paging indicator by the second UE 12.

In examples, the part 18 of the scheduling gap 16 can be and/or comprise any suitable part 18 of the scheduling gap 16.

In some examples, the part 18 of the scheduling gap 16 comprises at least a portion of the scheduling gap after a part of the scheduling gap 16 corresponding to possible reception of an early paging indication by the second UE 12, for example a PEI.

By way of example, reference is made to FIG. 3.

In FIG. 3, the upper portion relates to the first UE 10 on the first network and the lower portion relates to the second UE 12 on the second network.

Two different examples are shown in the left and right portions of FIG. 3 respectively.

The shaded rectangle in the upper portion of FIG. 3 illustrates the duration of the configured scheduling gap 16 for the first UE 10. The scheduling gap 16 corresponds to a paging occasion 20 of the second UE 12, as illustrated in the lower portion of FIG. 3.

In the example of FIG. 3 a dashed line separating the scheduling gap 16 into two parts is also shown.

In the illustrated example, the part of the scheduling gap 16 to the left of the dashed line corresponds to possible reception of an early paging indication by the second UE 12, such as a PEI.

For example, in the left portion of FIG. 3 an early paging indication is received by the second UE 12 and in the right portion of FIG. 3 an early paging indication is not received by the second UE 12.

In examples, the part 18 of the scheduling gap 16 is/comprises the part 18 of the scheduling gap 16 to the right of the dashed line in FIG. 3 which is the portion of the scheduling gap 16 after a part of the scheduling gap 16 corresponding to possible reception of an early paging indication by the second UE 12.

Other features of FIG. 3 will be discussed in greater detail below.

Referring to FIG. 2, at block 208, method 200 comprises if it is determined that there is traffic to schedule for the first UE 10 during a part 18 of the scheduling gap 16, transmitting configuration information 22 to the first UE 10 to configure the first UE 10 to provide a response indicating device availability of the device for the part 18 of the scheduling gap 16.

Accordingly, from the point of view of the terminal node 110 and/or the first UE 10, block 208 comprises receiving configuration information 22 to configure the first UE 10, in radio connected mode, to provide a response indicating device availability of the device for a part 18 of a configured scheduling gap 16 for the first UE 10 corresponding to a paging occasion 20 of the second UE 12, the second UE 12 not in radio connected mode.

In examples, providing a response indicating device availability of the device can be considered providing information and/or an indication of device availability.

In some examples, block 208 can be considered to comprise receiving configuration information 22 to configure the first UE 10, in radio connected mode, to provide a response indicating first UE 10 availability for a part 18 of a configured scheduling gap 16 for the first UE 10 corresponding to a paging occasion 20 of the second UE 12, the second UE 12 not in radio connected mode.

In examples, device availability and/or first UE 10 availability for the part 18 of the configured scheduling gap 18 can be considered device availability and/or first UE 10 availability for scheduling of traffic during the part 18 of the configured scheduling gap 16.

In examples, the configuration information 22 can have any suitable form and/or comprise any suitable information.

In examples, the form of the configuration information 22 can depend on the type of traffic and/or service at the first UE 10. For example, the form of the configuration information 22 can be different for ongoing traffic at the first UE 10 compared to no ongoing traffic at the first UE 10.

In examples, the configuration information 22 can be transmitted in any suitable way. In some examples, such as some examples where there is ongoing traffic with the first UE 10, the configuration information 22 can be transmitted with a radio connection reconfiguration message, such as an RRCConnectionReconfiguration message.

In some examples, the configuration information 22 comprises at least one uplink grant. For example, the configuration information 22 can comprise a single uplink grant or a configured grant.

In examples, the configuration information 22 comprises a physical downlink control channel with a single uplink grant.

In some examples, the configuration information 22 comprises information to configure the terminal node 110 and/or first UE 10 to provide an appropriate acknowledgement, such as a control channel acknowledgement.

In some examples, such as some examples where there is no ongoing traffic with the first UE 10, the configuration information 22 comprises information to inform the first UE 10 that there is traffic to be scheduled for the first UE 10 during the part 18 of the scheduling gap 16. See, for example, FIGS. 6 and 7.

In examples, such as some examples where there is no ongoing traffic with the first UE 10, the configuration information 22 can be considered to be and/or comprise an indication of traffic for scheduling.

In some examples, such as some examples where there is no ongoing traffic with the first UE 10, the configuration information 22 can be considered a scheduling early indication (SEI) and/or an activation signal.

By way of example, reference is again made to FIG. 3.

In the examples illustrated in FIG. 3, the arrow pointing downwards across the illustrated scheduling gap 16 in the upper portion of FIG. 3 shows transmission/receipt of configuration information 22 in the form of an SEI.

In the example of FIG. 3, the SEI is transmitted/received after the part of the scheduling gap 16 corresponding to possible reception of an early paging indication by the second UE 12, such as a PEI.

Accordingly, in the examples shown in FIG. 3, the network node transmits the configuration information 22, which in these examples is in the form of an SEI, to inform the first UE 10 that there is traffic to be scheduled in the part 18 of the scheduling gap 16.

In the illustrated example, the first UE 12 is configured by the pre-configuration information 32 to monitor for the configuration information 22.

In the example to the left of FIG. 3, the second UE 12 receives an early paging indication, in the form of a PEI, and therefore the first UE 12 is not available during the part 18 of the scheduling gap 16 as the second UE 12 monitors for paging during the part 18 of the scheduling gap 16.

However, in the example to the right of FIG. 3, the second UE 12 does not receive an early paging indication and therefore the first UE 12 is available during the part 18 of the scheduling gap 16.

In the illustrated example, as an SEI has been received, the first UE 10 can respond to inform the network node that the first UE 10 is available for scheduling during the part 18 of the scheduling gap 16.

Referring to FIG. 2, in examples, the response indicating device availability of the device for the part 18 of the scheduling gap 16 can comprise any suitable information having any suitable form.

For example, the response indicating device availability of the device can comprise an acknowledgement, such as a control channel acknowledgement, and/or a response on at least one uplink grant configured by the configuration information 22.

In examples, the response indicating device availability of the device can be positive or negative in nature. For example, the response indicating device availability of the device can indicate that that the first UE 10 is or is not available for scheduling of traffic during the part 18 of the scheduling gap 16.

In examples, such as some examples where there is no ongoing traffic with the first UE 10, the configuration information 22 comprises information at least indicative of a traffic type and/or service type associated with the traffic.

Accordingly, in examples, the configuration information 22, which can be in the form of an SEI, comprises information at least indicative of a traffic type and/or service type associated with the traffic to be scheduled for the first UE 10 during the part 18 of the scheduling gap 16.

In examples, the information at least indicative of a traffic type and/or service type associated with the traffic can be used by the terminal node 110 and/or first UE 10 in determining if the first UE 10 should be made available for scheduling of traffic during the part 18 of the scheduling gap 16.

For example, for a given traffic and/or service type, the first UE 10 is made available for scheduling during the part 18 of the scheduling gap 18 but for a different traffic and/or service type priority is given to the second UE 12 during the part 18 of the scheduling gap 16 and the first UE 10 is not made available for scheduling during the part of the scheduling gap 22.

In some examples where the assistance information 28 comprises paging probability information method 200 comprises determining whether to transmit the configuration information 22 based, at least in part, on the paging probability information or determining whether to schedule traffic for the first user equipment during the part of the scheduling gap based, at least in part on the paging probability information.

In examples, determining whether to transmit the configuration information 22 based, at least in part, on the paging probability information or determining whether to schedule traffic for the first user equipment during the part of the scheduling gap based, at least in part on the paging probability information can be performed in any suitable way using any suitable method.

For example, the network node can start a persistence test and/or probability test prior to sending the configuration information 22, which can be in the form of an SEI/activation signal.

In examples, such as some examples where there is ongoing traffic at the first UE 10, the configuration information 22 comprises information to configure the first UE 10 to resume radio connected operation during the part 18 of the scheduling gap 16 unless the second UE 12 receives an early indication of paging. See, for example, FIG. 8.

For example, the configuration information 22 can be transmitted as part of an RRCConnectionReConfiguration message to configure the first UE 10 to resume radio connected operation during the part of the scheduling gap 16 unless the second UE 12 receives an early indication of paging, such as a PEI.

At block 210, method 200 comprises monitoring for a response 26 from the first user equipment 10.

Consequently, FIG. 2 illustrates a method 200 comprising:

- enabling scheduling gap usage in relation to a device with multiple subscriptions comprising at least a first subscription configured to enable a first user equipment 10 at the device and a second user equipment 12 at the device by:
- determining if there is traffic to schedule for the first user equipment 10, in radio connected mode, during a part 18 of a configured scheduling gap 16 for the first user equipment 10 corresponding to a paging occasion of the second user equipment 12, the second user equipment 12 not in radio connected mode;
- if it is determined that there is traffic to schedule for the first user equipment 10 during a part 18 of the scheduling gap 16, transmitting configuration information 22 to the first user equipment 10 to configure the first user equipment 10 to provide a response indicating device availability of the device for the part 18 of the scheduling gap 16; and
- monitoring for a response 26 from the first user equipment 10.

In examples, monitoring for a response 26 from the first UE 10 can be performed in any suitable way using any suitable method.

In examples, monitoring for a response 26 comprises monitoring for a response 26 configured by the configuration information 22.

In examples, the response 26 can have any suitable form. For example, the response 26 can have any suitable form to provide information of the device/first UE 10 availability for the part 18 of the scheduling gap 16.

In examples, the response 26 can be and/or comprise an acknowledgement configured by the configuration information 22, such as a control channel acknowledgement.

In some examples, the response 26 can be a response 26 transmitted on at least one uplink grant configured by the configuration information 22.

Accordingly, in examples the configuration information 22 comprises at least one uplink grant and monitoring for a response 26 from the first UE 10 comprises monitoring for a response 26 from the first UE 10 on the at least one uplink grant and/or at least one of the at least one uplink grant.

At block 212, method 200 comprises determining whether to transmit a response 26 indicating device availability of the device for the part 18 of the configured scheduling gap 16.

In examples, at block 212, method 200 can be considered to comprise determining whether to transmit a response 26 indicating first UE 10 availability for the part 18 of the configured scheduling gap 16.

In examples, block 212 can be performed by the terminal node 110 and/or the first UE 10.

In examples, determining whether to transmit a response 26 can be performed in any suitable way using any suitable method and based on any suitable information.

In examples, determining whether to transmit a response 26 comprises determining if the first UE 10 is available for scheduling of traffic during the part 18 of the scheduling gap 16.

In examples, determining whether to transmit a response 26 comprises determining if an early indication of paging, such as a PEI, has been received by the second UE 10.

For example, the second UE 12 can provide information to the first UE 10 to inform the first UE 10 if an early indication of paging, such as a PEI, has and/or has not been received and, in examples, determining whether to transmit a response 26 can be performed based, at least in part, on the information.

In examples, a response 26 can have any suitable form as described in relation to block 210.

In examples, a response 26 can comprise an indication of device and/or first UE 10 availability as described in relation to block 208. For example, a response 26 can be positive in nature, indicating availability, or negative in nature, indicating no availability.

In some examples, determining whether to transmit a response can comprise consideration of other information, such as traffic and/or service type of traffic to be scheduled for the first UE 10 during the part 18 of the scheduling gap 16.

For example, in some examples where the configuration information 22 comprises information at least indicative of a traffic type and/or service type, determining whether to transmit a response can be based, at least in part, on the information.

For example, in some examples where no early paging indication is received by the second UE 12, the terminal node 110 and/or first UE 10 can determine that priority should be given to the second UE 12 for the full duration of the scheduling gap 16 based, at least in part, on the traffic type and/or service type of traffic to be scheduled for the first UE 10 during the part 18 of the scheduling gap 16.

In examples, such as some examples where there is no ongoing traffic with the first UE 10, if no configuration information 22 is transmitted/received because there is no traffic to schedule for the first UE 10 during the scheduling gap 16, blocks 212 and 214 are not performed as early return of the first UE to scheduling is not needed and therefore the second UE 12 can make use of the full scheduling gap 16. See, for example, FIG. 7.

At block 214, method 200 comprises if it is determined that a response 26 is to be sent, transmitting a response 26.

Consequently, FIG. 2 illustrates a method 200 comprising:

supporting scheduling gap usage in relation to a device with multiple subscriptions comprising at least a first subscription configured to enable a first user equipment 10 at the device and a second user equipment 12 at the device by:

receiving configuration information 22 to configure the first user equipment 10, in radio connected mode, to provide a response indicating device availability of the device for a part 18 of a configured scheduling gap 16 for the first user equipment 16 corresponding to a paging occasion 20 of the second user equipment 12, the second user equipment 12 not in radio connected mode;

determining whether to transmit a response 26 indicating device availability of the device for the part 18 of the configured scheduling gap 16; and if it is determined that a response 26 is to be sent, transmitting a response 26.

In examples, at block 214, method 200 can be considered to comprise if it is determined that a response 26 is to be sent, transmitting a response 26 indicating device and/or first UE 10 availability for the part 18 of the configured scheduling gap 16.

In examples, at block 214, method 200 can be considered to comprise if it is determined that a response 26 is to be sent, transmitting a response 26 comprising information 24 of the device and/or first UE 10 availability for the part 18 of the configured scheduling gap 16.

In examples, any suitable response comprising any suitable information can be transmitted in any suitable way.

For example, the response 26 can have any suitable form as described in relation to block 210.

For example, the response 26 can comprise any suitable indication of device and/or first UE 10 availability as described in relation to block 208.

In examples, the configuration information 22 comprises at least one uplink grant. In some such examples, determining whether to transmit a response 26 comprises determining whether to transmit a response 26 comprises determining whether to transmit a response 26 on the at least one uplink grant and transmitting a response 26 comprises transmitting a response 26 on at least one of the at least one uplink grant.

In some examples, transmitting a response 26 comprises transmitting an acknowledgement, such as a control channel acknowledgement, to appropriately indicate device and/or first UE 10 availability during the part 18 of the scheduling gap 16.

In examples, the response 26 can indicate that the device and/or first UE 10 is available or is not available for scheduling of traffic during the part 18 of the scheduling gap 16.

Accordingly, in examples, from the point of view of the network node, method 200 comprises receiving a response 26 indicating that the device and/or the first UE 10 is or is not available for scheduling of traffic during the part 18 of the scheduling gap 16.

For example, in some examples where there is no ongoing traffic with the first UE 10, the response can indicate that the device and/or first UE 10 is available for scheduling of traffic during the part 18 of the scheduling gap 16.

Accordingly, in some examples, method 200 comprises receiving a response 26 from the first UE 10, the response 26 indicating that the first UE 10 is available for scheduling of traffic in the part 18 of the scheduling gap 16 and in response to receiving the response 26 from the first UE 10, scheduling traffic for the first UE 10 during the part 18 of the scheduling gap 16.

For example, in some examples where there is ongoing traffic with the first UE 10, the response 26 can indicate that the device and/or first UE 10 is not available for scheduling of traffic during the part 18 of the scheduling gap 16.

Accordingly, in some examples, method 200 comprises receiving a response 26 from the first UE 10, the response 10 indicating that the first UE 10 is not available for scheduling of traffic in the part 18 of the scheduling gap 16 and in response to receiving the response 26 from the first UE 10, preventing scheduling of traffic for the first UE 10 during the part 18 of the scheduling gap 16.

In examples, the terminal node 110 is configured to switch between the first and second UEs 10, 12 appropriately to transmit the response 26 to the network node. For example, the terminal node 110 can be configured to switch to the first network between the early paging indication, such as PEI, and subsequent receipt of paging information, such as PDCCH occasions, for the second UE 12.

In some examples, such as some examples where there is ongoing traffic with the first UE 10, method 200 comprises detecting no response 26 from the first UE 10 and in response to not detecting a response 26 from the first UE 10, scheduling traffic for the first UE 10 during the part 18 of the scheduling gap 16.

Accordingly, in some examples where there is ongoing traffic with the first UE 10, the configuration information 22 configures the first UE 10 to resume radio connected operation during the part 18 of the scheduling gap 16 if possible and when no response 16 indicating that the first UE 10 is unavailable is detected, scheduling of traffic for the first UE 10 in the part 18 of the scheduling gap 16 can proceed.

In some examples, from the point of view of the terminal node 110 and/or first UE 10, method 200 comprises determining that the first UE 10 is available for scheduling of traffic during the part 18 of the scheduling gap 16 and in response to determining that the first UE 10 is available for scheduling of traffic during the part 18 of the scheduling gap 16, resuming radio connected operation during the part 18 of the gap 16 without transmitting a response 26 on at least one of the at least one uplink grant.

Examples of the disclosure provide technical benefits. For example, examples of the disclosure provide means to prepare efficient and/or proper use of a configured scheduling gap by a network associated with a UE, of a multi-subscription device, in radio connected mode.

Examples provide for a network associated with a UE, of a multi-subscription device, in radio connected mode to prepare for the early return of the UE to scheduling of traffic, prior to the end of a configured scheduling gap.

Figure 4:
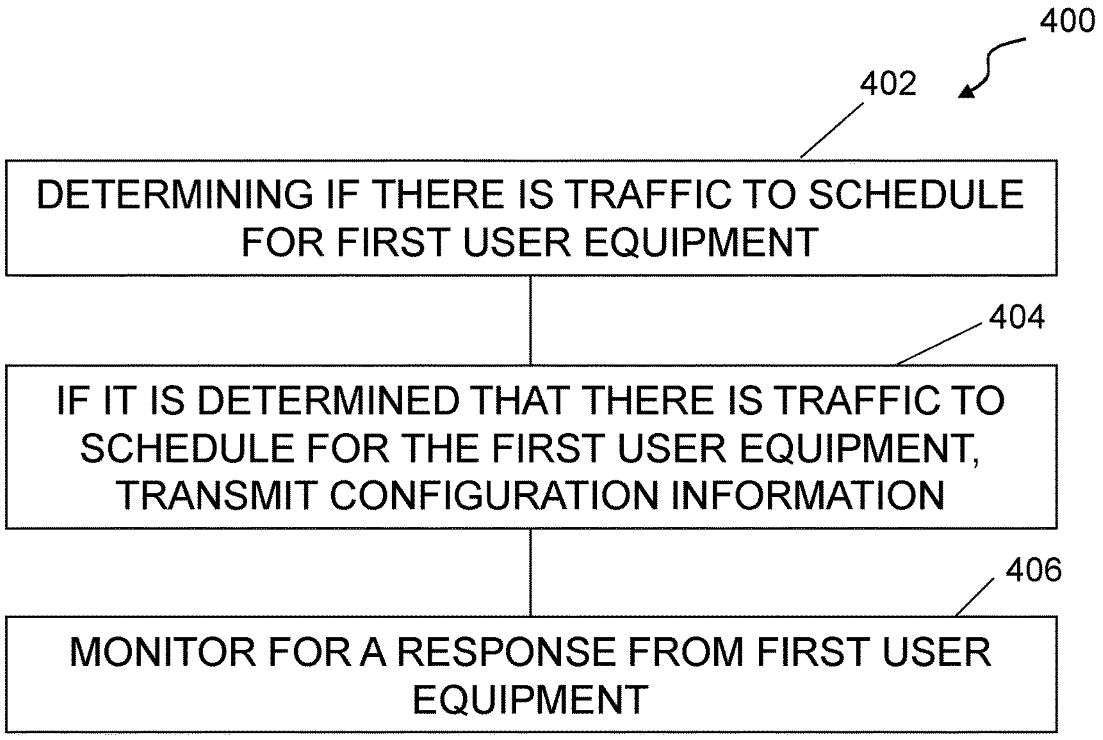
FIG. 4 shows another example of the subject matter described herein.

FIG. 4 illustrates an example of a method 400.

In examples, the method 400 can be performed by any suitable apparatus comprising any suitable means for performing the method 400.

In examples, the method 400 can be performed by a network node such as an access node 120 or a core node 129.

Method 400 comprises enabling scheduling gap usage in relation to a device with multiple subscriptions comprising at least a first subscription configured to enable a first user equipment 10 at the device and a second user equipment 12 at the device by performing, at least, the blocks illustrated in the example of FIG. 4.

At block 402, method 400 comprises determining if there is traffic to schedule for the first user equipment 10, in radio connected mode, during a part 18 of a configured scheduling gap 16 for the first user equipment 10 corresponding to a paging occasion 20 of the second user equipment 12, the second user equipment 12 not in radio connected mode.

At block 404, method 400 comprises if it is determined that there is traffic to schedule for the first user equipment 10 during a part 18 of the scheduling gap 16, transmitting configuration information 22 to the first user equipment 10 to configure the first user equipment 10 to provide a response indicating device availability of the device for the part 18 of the scheduling gap 16.

At block 406, method 400 comprises monitoring for a response 26 from the first user equipment 10.

Consequently, FIG. 4 illustrates a method 400 comprising:

- enabling scheduling gap usage in relation to a device with multiple subscriptions comprising at least a first subscription configured to enable a first user equipment at the device and a second subscription configured to enable a second user equipment at the device by:
  - determining if there is traffic to schedule for the first user equipment, in radio connected mode, during a part of a configured scheduling gap for the first user equipment corresponding to a paging occasion of the second user equipment, the second user equipment not in radio connected mode;
  - if it is determined that there is traffic to schedule for the first user equipment during a part of the scheduling gap, transmitting configuration information to the first user equipment to configure the first user equipment to provide a response indicating device availability of the device for the part of the scheduling gap; and
  - monitoring for a response from the first user equipment.

Figure 5:
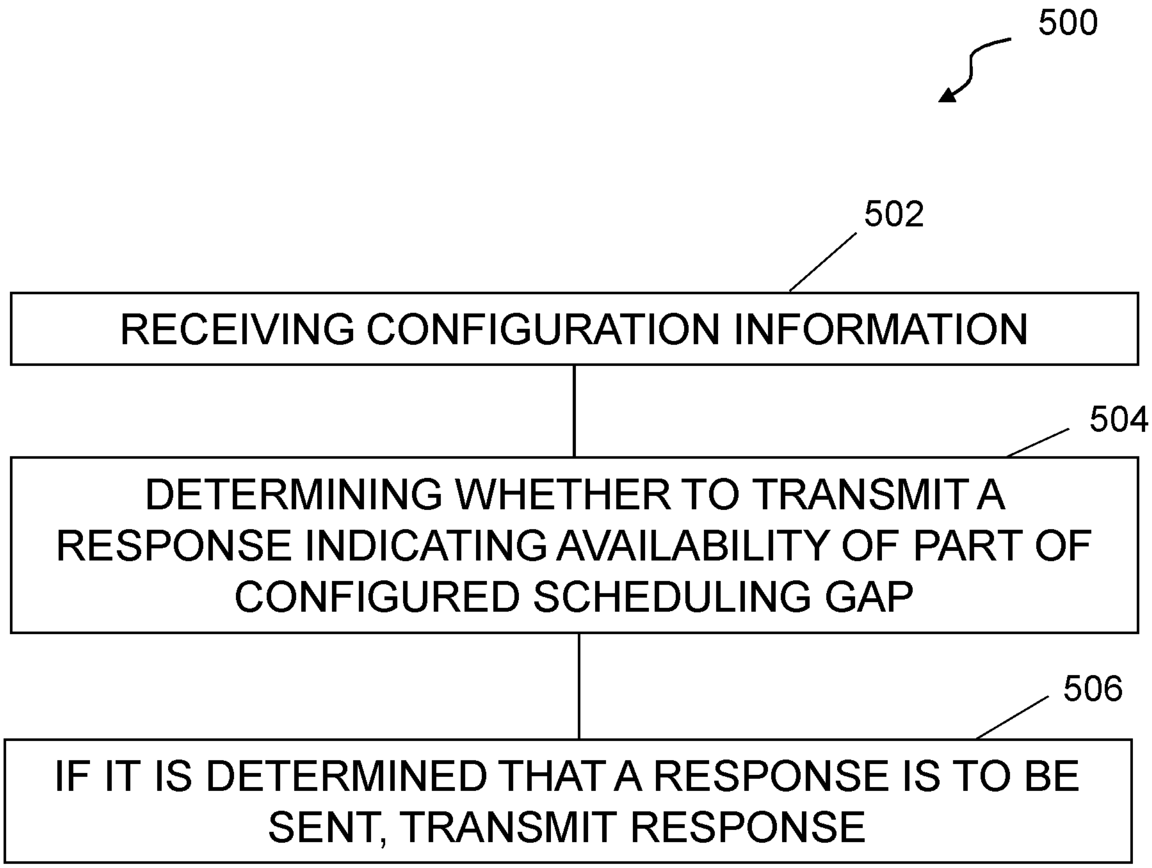
FIG. 5 shows another example of the subject matter described herein.

FIG. 5 illustrates an example of a method 500.

In examples, the method 500 can be performed by any suitable apparatus comprising any suitable means for performing the method 500.

In examples, the method 400 can be performed by a terminal node 110, such as a MUSIM device.

Method 500 comprises supporting scheduling gap usage in relation to a device with multiple subscriptions comprising at least a first subscription configured to enable a first user equipment 10 at the device and a second subscription configured to enable a second user equipment 12 at the device by performing, at least, the blocks illustrated in the example of FIG. 5.

At block 502, method 500 comprises receiving configuration information 22 to configure the first user equipment 10, in radio connected mode, to provide a response indicating device availability of the device for a part 18 of a configured scheduling gap 16 for the first user equipment 10 corresponding to a paging occasion 20 of the second user equipment 12, the second user equipment 12 not in radio connected mode.

At block 504, method 500 comprises determining whether to transmit a response 26 indicating device availability of the device for the part 18 of the configured scheduling gap 16.

At block 506, method 500 comprises if it is determined that a response 26 is to be sent, transmitting a response 26.

Consequently, FIG. 5 illustrates a method 500 comprising:

- supporting scheduling gap usage in relation to a device with multiple subscriptions comprising at least a first subscription configured to enable a first user equipment 10 at the device and a second subscription configured to enable a second user equipment 12 at the device by:
  - receiving configuration information 22 to configure the first user equipment 10, in radio connected mode, to provide a response indicating device availability of the device for a part 18 of a configured scheduling gap 16 for the first user equipment 10 corresponding to a paging occasion 20 of the second user equipment 12, the second user equipment 12 not in radio connected mode;
  - determining whether to transmit a response 26 indicating device availability of the device for the part 18 of the configured scheduling gap 16; and
  - if it is determined that a response 26 is to be sent, transmitting a response 26.

Figure 6:
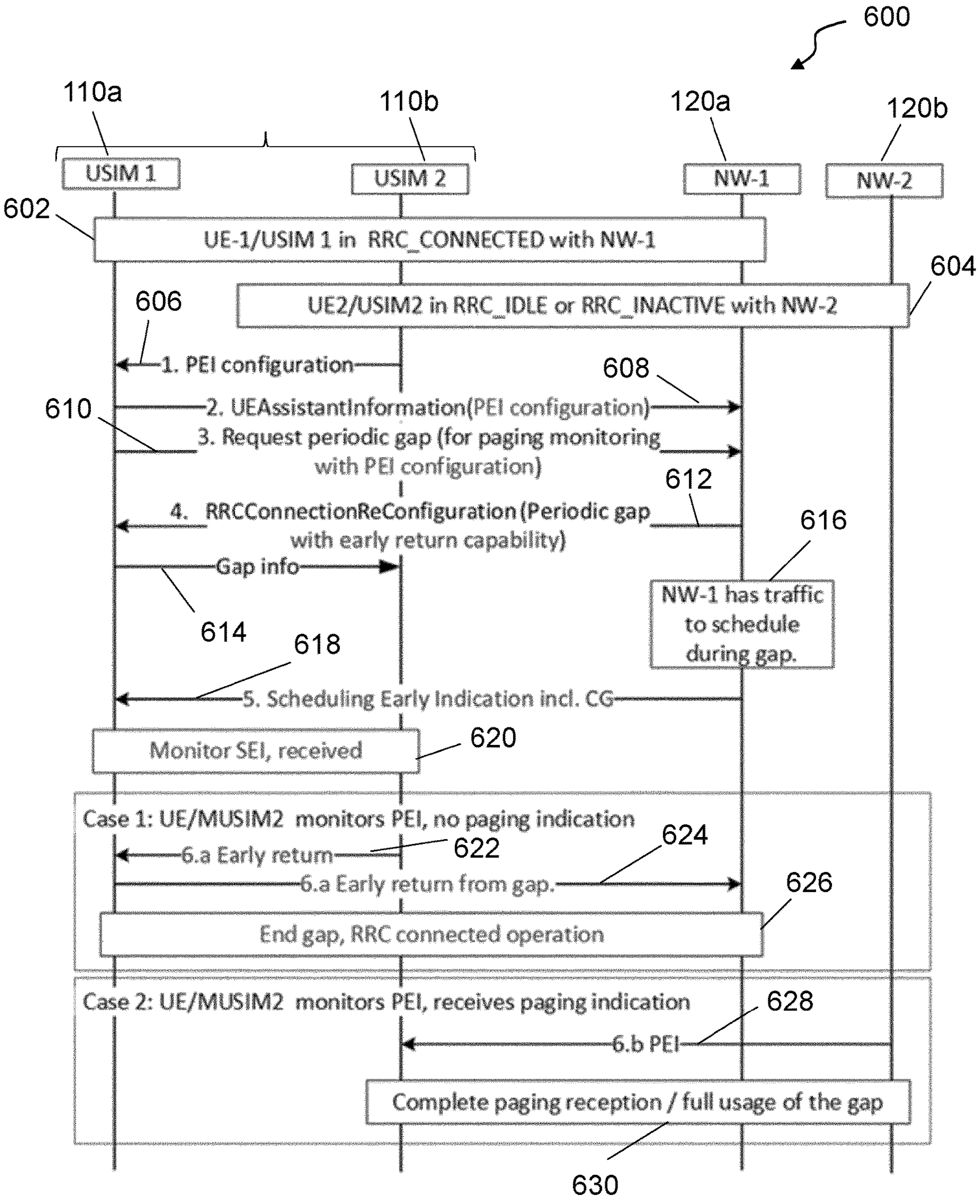
FIG. 6 shows another example of the subject matter described herein.

FIG. 6 shows an example of scheduling gap usage at a MUSIM device.

In the example of FIG. 6 a MUSIM device comprises a first USIM (USIM1) that enables a first UE 110*a* and a second USIM (USIM2) that enables a second UE 110*b*.

In the illustrated example, separate lines are presented to indicate actions at UE-1 and UE-2, although the UEs are enabled at one device.

Also represented in the example of FIG. 6 is a gNB associated with UE-1 and network 1 (NW-1) and a gNB associated with UE-2 and network 2 (NW-2) which, in the example of FIG. 6, is different to NW-1.

At block 602, UE1 is in RRC_CONNECTED with NW1 corresponding to its first USIM (NW-1, USIM-1).

At block 604, UE2 is in RRC_IDLE or RRC_INACTIVE with NW2 corresponding to its other USIM (NW-2, USIM2).

In the example of FIG. 6, NW-2 supports PEI and has given PEI configuration (for example, signal carrying PEI, UE's group, etc.).

At block 606 the device internally provides this information to the protocol stack instance corresponding to its connected USIM (USIM-1) which passes the information to its NW (NW-1).

This information can be provided to NW-1 at block 608 using UE assistance information signaling or as an information element in the UE's request for periodic gap at block 610.

At block 612, NW-1 provides configuration for the periodic gap with the possibility for early return. In examples, this can be considered pre-configuration information 32.

At block 614, this information is internally in the device forwarded to the protocol stack instance corresponding to its idle/inactive USIM (USIM-2).

If, as indicated at block 616, the NW1 receives data for the UE1 which needs scheduling during the gap, it will transmit a scheduling early indication (SEI) as indicated at block 618.

The SEI can be PDCCH with a configured grant (CG) for UE1 to transmit its response if it can return. The SEI can be considered configuration information 22.

The SEI can optionally include the service/traffic type for UE1 to decide if it wants to return even if the device does not find PEI or use the rest of the gap for other RX operations at UE2.

Case 1: if device does not detect any PEI, it will monitor for SEI at block 620 and can use the CG to inform the NW1 about its return or ignore if it decides to continue using the remaining part of the gap, e.g. for measurement.

At block 622 UE2 informs UE1 that early return is possible (no PEI) at block 624 UE1 informs NW-1 that it can return early.

When the NW received UE's early return at CG (block 624), it can end the gap and proceed with the scheduling of the arrived traffic at block 626.

Case 2: If the device does detect PEI at block 628, it will complete its paging task (block 630) and return when finished at planned gap end.

Figure 7:
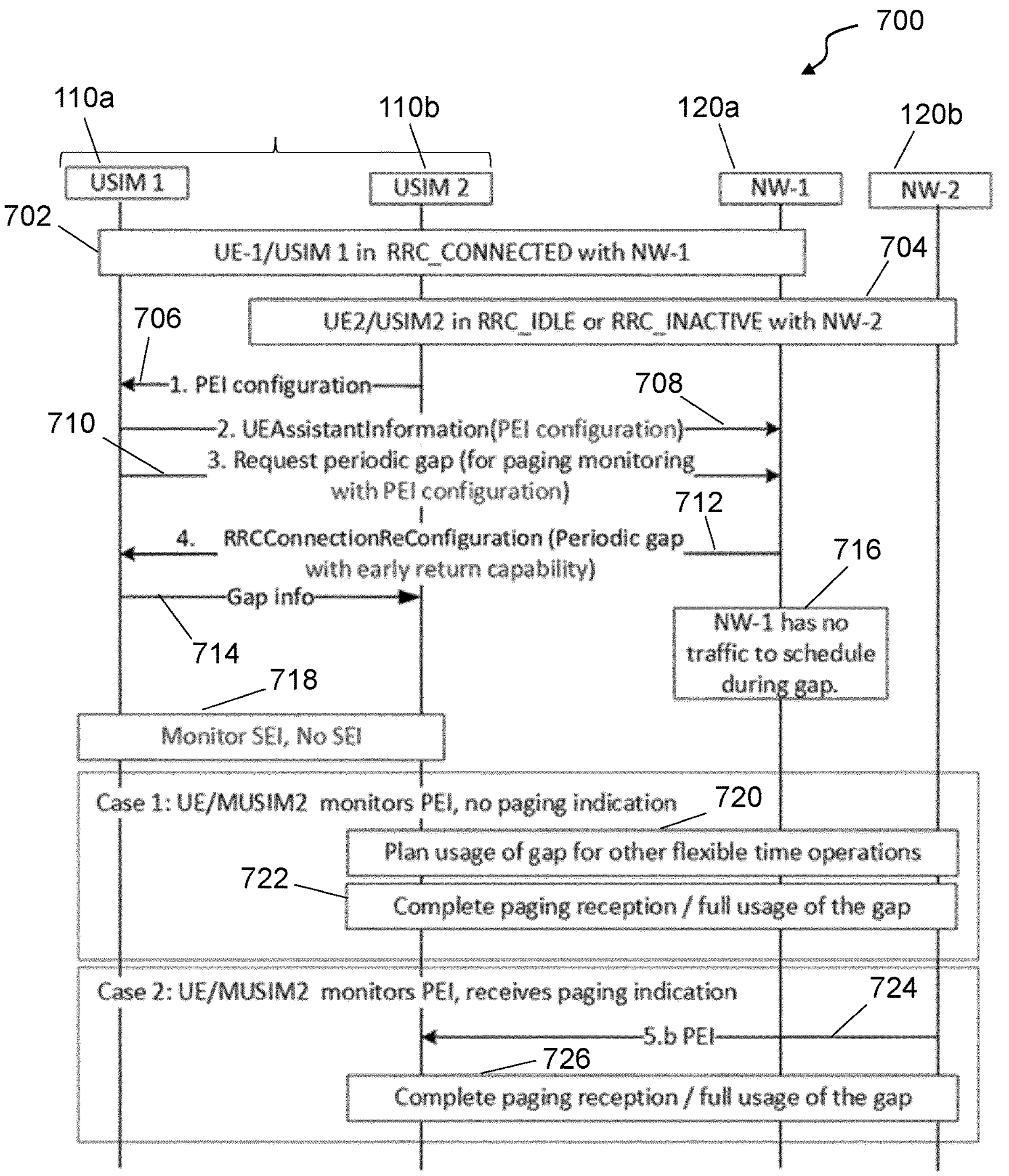
FIG. 7 shows another example of the subject matter described herein.

FIG. 7 shows an example of scheduling gap usage at a MUSIM device.

In the example of FIG. 7 a MUSIM device comprises a first USIM (USIM1) that enables a first UE 110*a* and a second USIM (USIM2) that enables a second UE 110*b*.

In the illustrated example, separate lines are presented to indicate actions at UE-1 and UE-2, although the UEs are enabled at one device.

Also represented in the example of FIG. 7 is a gNB associated with UE-1 and network 1 (NW-1) and a gNB associated with UE-2 and network 2 (NW-2) which, in the example of FIG. 7, is different to NW-1.

FIG. 7 is similar to the example of FIG. 6. However, in the example of FIG. 7, at block 716 there is no traffic to schedule during the gap.

In case there is no traffic for the UE1 during the gap, the NW1 will not transmit SEI.

In this case if the device does not find PEI nor SEI, it can use the remaining gap time to perform other idle/inactive mode operations like RRM measurements. See blocks 718 to 726.

Figure 8:
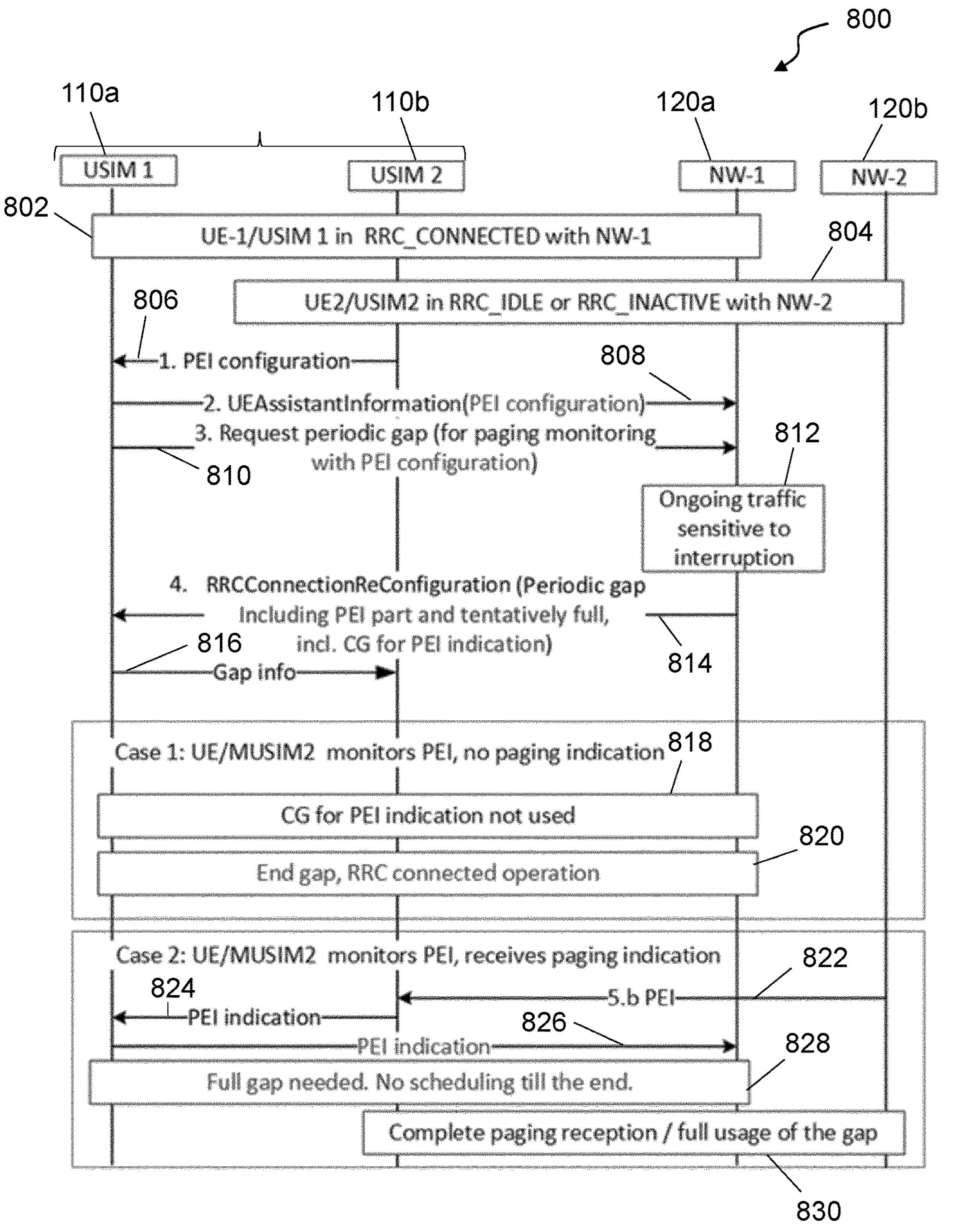
FIG. 8 shows another example of the subject matter described herein.

FIG. 8 shows an example of scheduling gap usage at a MUSIM device.

In the example of FIG. 8 a MUSIM device comprises a first USIM (USIM1) that enables a first UE 110*a* and a second USIM (USIM2) that enables a second UE 110*b*.

In the illustrated example, separate lines are presented to indicate actions at UE-1 and UE-2, although the UEs are enabled at one device.

Also represented in the example of FIG. 8 is a gNB associated with UE-1 and network 1 (NW-1) and a gNB associated with UE-2 and network 2 (NW-2) which, in the example of FIG. 8, is different to NW-1.

The example of FIG. 8 begins in a similar way to the examples of FIG. 6 and FIG. 7.

However, in the example of FIG. 8, at block 812 NW1 has already ongoing critical traffic when the gap request arrives from UE1 at block 810.

NW1 will consider the main gap for the device to receive the PEI while expecting a tentative longer gap in case the UE2 has identified paging addressed to it by receiving the PEI signal.

Accordingly, at block 814, NW1 transmits a RRCConnectionReConfiguration message including a CG for PEI indication. This can be considered configuration information 22. As there is ongoing traffic in the example of FIG. 8 there is no pre-configuration information 32.

If no paging indication is received the gap can be ended and RRC connected operation resumed as indicated at blocks 818 and 820.

If UE2 receives the PEI and thereby determines there is a paging addressed to it (block 822), it will inform UE1 (block 824) and UE1 will apply the configured uplink to indicate PEI reception to NW1 to inform UE2 is going to use the full gap as indicated at blocks 826 to 830.

Examples of the disclosure provide technical benefits. For example, examples of the disclosure provide for efficient use of a scheduling gap at a multi-subscription device.

Figure 9A:
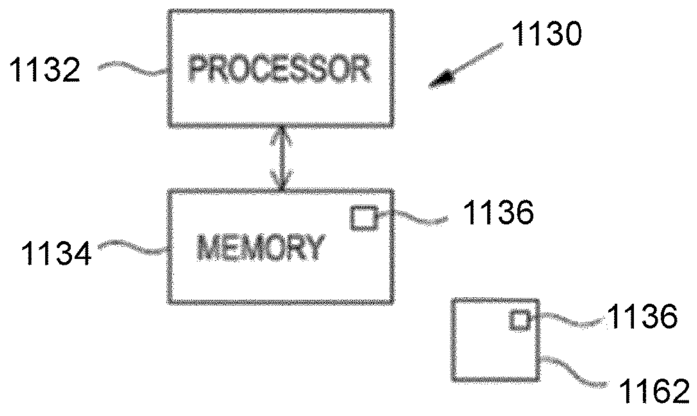
FIG. 9A shows another example of the subject matter described herein.

FIG. 9A illustrates an example of a controller 1130. The controller 1130 can be used in an apparatus such as a network node 110, 120, 129 such as a mobile terminal or UE and/or a gNB. In examples, controller 1130 can be considered an apparatus 1130.

Implementation of a controller 1130 may be as controller circuitry. The controller 1130 may be implemented in hardware alone, have certain aspects in software including firmware alone or can be a combination of hardware and software (including firmware).

As illustrated in FIG. 9A the controller 1130 may be implemented using instructions that enable hardware functionality, for example, by using executable instructions of a computer program 1136 in a general-purpose or special-purpose processor 1132 that may be stored on a computer readable storage medium (disk, memory etc.) to be executed by such a processor 1132.

The processor 1132 is configured to read from and write to the memory 1134. The processor 1132 may also comprise an output interface via which data and/or commands are output by the processor 1132 and an input interface via which data and/or commands are input to the processor 1132.

The memory 1134 stores a computer program 1136 comprising computer program instructions (computer program code) that controls the operation of the apparatus when loaded into the processor 1132. The computer program instructions, of the computer program 1136, provide the logic and routines that enables the apparatus to perform the methods illustrated in FIGS. 2 and/or 4 and/or 5 and/or 6 and/or 7 and/or 8.

The processor 1132 by reading the memory 1134 is able to load and execute the computer program 1136.

The apparatus therefore comprises:

at least one processor 1132; and at least one memory 1134 including computer program code the at least one memory 1134 and the computer program code configured to, with the at least one processor 1132, cause the apparatus at least to perform:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

The apparatus therefore comprises:

at least one processor 1132; and at least one memory 1134 including computer program code the at least one memory 1134 and the computer program code configured to, with the at least one processor 1132, cause the apparatus at least to perform:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

As illustrated in FIG. 9A, the computer program 1136 may arrive at the apparatus via any suitable delivery mechanism 1162. The delivery mechanism 1162 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 1136. The delivery mechanism may be a signal configured to reliably transfer the computer program 1136. The apparatus may propagate or transmit the computer program 1136 as a computer data signal.

Computer program instructions for causing an apparatus to perform at least the following or for performing at least the following:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

Computer program instructions for causing an apparatus to perform at least the following or for performing at least the following:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

The computer program instructions may be comprised in a computer program, a non-transitory computer readable medium, a computer program product, a machine-readable medium. In some but not necessarily all examples, the computer program instructions may be distributed over more than one computer program.

Although the memory 1134 is illustrated as a single component/circuitry it may be implemented as one or more separate components/circuitry some or all of which may be integrated/removable and/or may provide permanent/semi-permanent/dynamic/cached storage.

Figure 9B:
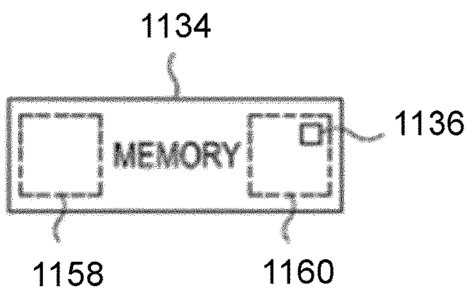
FIG. 9B shows another example of the subject matter described herein.

In examples the memory 1134 comprises a random-access memory 1158 and a read only memory 1160. In examples the computer program 1136 can be stored in the read only memory 1158. See, for example, FIG. 9B In some examples the memory 1134 can be split into random access memory 1158 and read only memory 1160.

Although the processor 1132 is illustrated as a single component/circuitry it may be implemented as one or more separate components/circuitry some or all of which may be integrated/removable. The processor 1132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 4 and/or 5 and/or 6 and/or 7 and/or 8 may represent steps in a method and/or sections of code in the computer program 1136.

The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus can, in examples, comprise means for:

enabling scheduling gap usage in relation to a device with multiple subscriptions comprising at least a first subscription configured to enable a first user equipment at the device and a second subscription configured to enable a second user equipment at the device by:

determining if there is traffic to schedule for the first user equipment, in radio connected mode, during a part of a configured scheduling gap for the first user equipment corresponding to a paging occasion of the second user equipment, the second user equipment not in radio connected mode;

if it is determined that there is traffic to schedule for the first user equipment during a part of the scheduling gap, transmitting configuration information to the first user equipment to configure the first user equipment to provide a response indicating device availability of the device for the part of the scheduling gap; and monitoring for a response from the first user equipment.

Thus, the apparatus can, in examples, comprise means for:

supporting scheduling gap usage in relation to a device with multiple subscriptions comprising at least a first subscription configured to enable a first user equipment at the device and a second subscription configured to enable a second user equipment at the device by:

receiving configuration information to configure the first user equipment, in radio connected mode, to provide a response indicating device availability of the device for a part of a configured scheduling gap for the first user equipment corresponding to a paging occasion of the second user equipment, the second user equipment not in radio connected mode;

determining whether to transmit a response indicating device availability of the device for the part of the configured scheduling gap; and if it is determined that a response is to be sent, transmitting a response.

In examples, an apparatus can comprise means for performing one or more methods, and/or at least part of one or more methods, as disclosed herein.

In examples, an apparatus can be configured to perform one or more methods, and/or at least part of one or more methods, as disclosed herein.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory including computer program code;

the at least one memory and the computer program code configured to, with the at least one processor, cause the apparatus to:

enable scheduling gap usage in relation to a terminal node device with multiple subscriptions, the multiple subscriptions comprising:

at least a first 3GPP subscription configured to enable a first user equipment at the terminal node device to cause the terminal node device to function as the first equipment based on the first 3GPP subscription, and a second enhanced support of non-public networks (eNPN) subscription configured to enable a second user equipment at the terminal node device to cause the terminal node device to function as the second user equipment based on the eNPN subscription;

determine if there is traffic to schedule for the terminal node device functioning as the first user equipment when in RRC CONNECTED mode, during a part of a configured scheduling gap for the terminal node device functioning as the first user equipment, the part of the configured scheduling gap corresponding to a paging occasion of the terminal node device functioning as the second user equipment when the terminal node device functioning as the second user equipment is in RRC INACTIVE mode;

receive assistance information, the assistance information comprising information at least indicative of an early paging indication configuration of the terminal node device functioning as the second user equipment at a network, wherein the assistance information further comprises paging probability information;

determine to schedule traffic for the terminal node device functioning as the first user equipment during the part of the configured scheduling gap based, at least in part, on the paging probability information, wherein the paging probability information comprises:

information at least indicative of a probability that the terminal node device functioning as the second user equipment will be paged at a given paging occasion, and information at least indicative of how frequently the terminal node device functioning as the second user equipment has been paged over a number of previous paging occasions;

based on determining that there is traffic to schedule for the terminal node device functioning as the first user equipment during the part of the configured scheduling gap, transmit configuration information to the terminal node device functioning as the first user equipment to configure the terminal node device functioning as the first user equipment to provide a response indicating availability for the part of the configured scheduling gap, wherein the configuration information comprises:

a physical downlink control channel with a single uplink grant, information to inform the terminal node device functioning as the first user equipment that there is traffic to be scheduled for the terminal node device functioning as the first user equipment during the part of the configured scheduling gap, information at least indicative of a traffic type and a service type associated with the traffic, information to configure the terminal node device functioning as the first user equipment to resume radio connected operation during the part of the configured scheduling gap unless the terminal node device functioning as the second user equipment receives an early indication of paging;

transmit pre-configuration information to the terminal node device functioning as the first user equipment, the pre-configuration information comprising information to inform the terminal node device functioning as the first user equipment that scheduling of traffic for the terminal node functioning as the first user equipment will start prior to end of the configured scheduling gap;

monitor for a response from the terminal node device functioning as the first user equipment;

in case of a response from the terminal node device functioning as the first user equipment indicating that the terminal node device functioning as the first user equipment is available for scheduling of traffic in the part of the configured scheduling gap, schedule traffic for the terminal node device functioning as the first user equipment during the part of the configured scheduling gap;

in case of a response from the terminal node device functioning as the first user equipment indicating that the terminal node device functioning as the first user equipment is not available for scheduling of traffic in the part of the configured scheduling gap, prevent scheduling of traffic for the terminal node device functioning as the first user equipment during the part of the configured scheduling gap; and in case of no response from the first user equipment, schedule traffic for the terminal node device functioning as the first user equipment during the part of the configured scheduling gap, wherein the terminal node device functions as the first user equipment with a first network and functions as the second user equipment with a second network different from the first network, wherein the terminal node device cannot receive from both the first network and the second network simultaneously, and wherein a radio connection of the terminal node device functioning as the first user equipment with the first network can be interrupted by paging by the second network for the terminal node device functioning as the second user equipment.

* * * * *